United States Patent Office 3,123,294
Patented Mar. 3, 1964

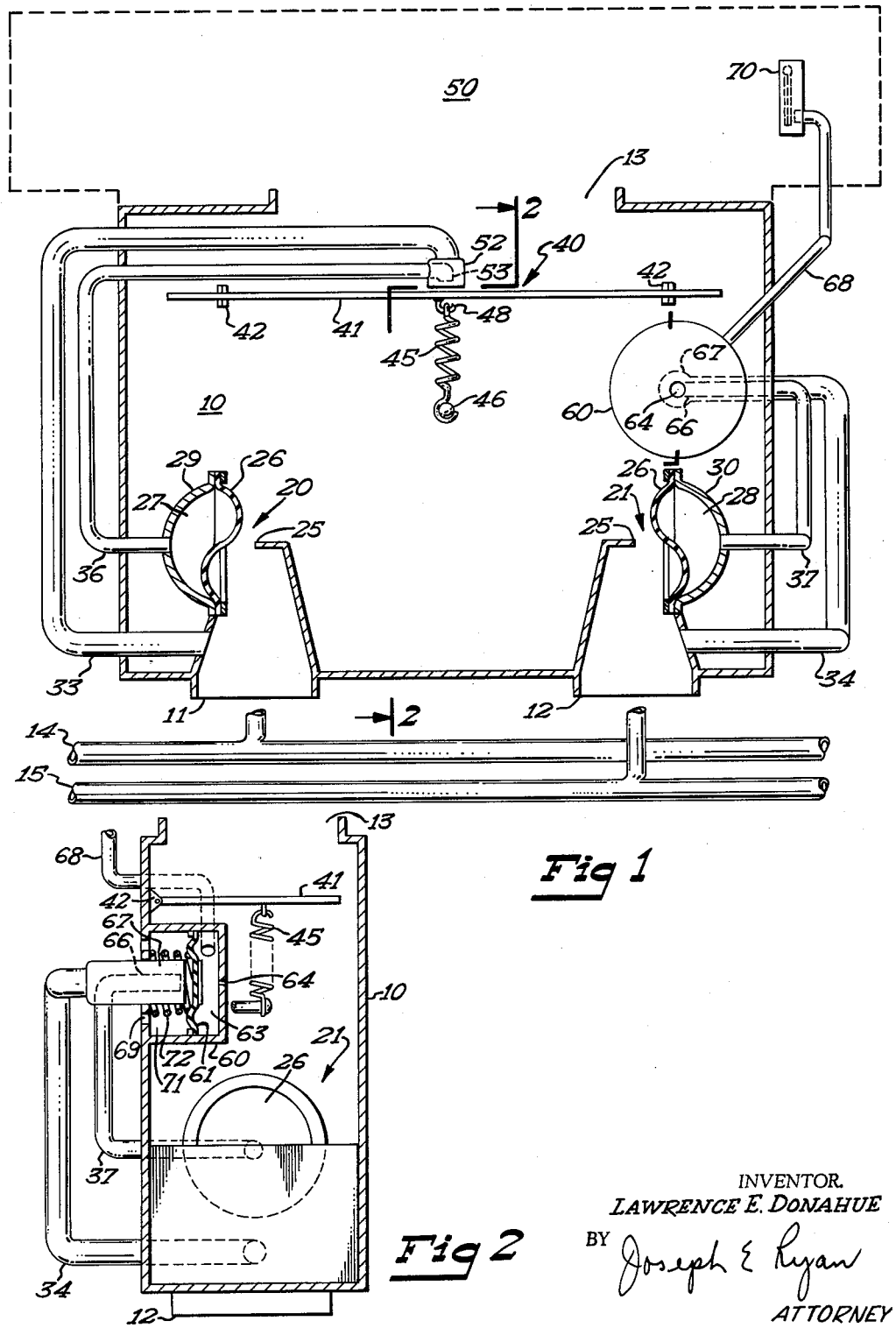

3,123,294
AIR CONDITIONING MIXING BOX CONTROL
Lawrence E. Donahue, Mount Prospect, Ill., assignor to Minneapolis-Honeywell Regulator Company, Minneapolis, Minn., a corporation of Delaware
Filed Apr. 19, 1962, Ser. No. 188,734
4 Claims. (Cl. 236—13)

This invention relates to air conditioning apparatus of the double duct high velocity type utilizing mixing boxes for air mixing and distribution purposes. The invention is particularly directed to an improved mixing box control apparatus combining a simplified pressure regulating or volume control with temperature control.

Air conditioning control apparatus for double duct air conditioning systems utilizing mixing boxes is well known. The present invention is directed to a simplified mixing box configuration and control apparatus which utilizes a pivoted mixing baffle as a static pressure sensor within the mixing box and combines it with a bleed type orifice associated with a self-contained valve of the mixing box to control its operation as a flow regulator. The control apparatus includes a similar control valve responsive to temperature of the space to be air conditioned and which acts in conjunction with the pressure regulating valve to control flow of conditioned air to the space to be air conditioned at the proper temperature and in the proper volume to meet temperature and circulation requirements. This over-all apparatus utilizes a mixing box itself as a regulating device for one of the inlet valves to the mixing box for volume control purposes, with the other valve being controlled primarily by temperature.

It is therefore an object of this invention to provide an improved air conditioning control apparatus with a simplified control valving and flow sensor or pressure regulator. Another object of this invention is to provide in a mixing box control apparatus an arrangement in which a pivoted diffusing baffle within the box is utilized as a pressure sensor for the pressure regulator which combines with the box and a control valve to become a pressure regulator in control of the operation of a main valve leading thereto. A further object of this invention is to provide in a mixing box control apparatus simplicity of construction and greater accuracy in control with a pressure regulating device and a bleed valve construction. These and other objects of this invention will become apparent from a reading of the attached description together with the drawings wherein:

FIGURE 1 is a schematic diagram of the mixing box with associated control apparatus, and FIGURE 2 is a sectional view of the mixing box taken along the line 2—2 in FIGURE 1.

The improved air conditioning control apparatus is shown schematically in FIGURE 1 as including the mixing box indicated generally at 10, which box includes a pair of inlet conduits 11 and 12 and a discharge opening 13. The inlet conduits are adapted to be connected to supply conduits 14, 15 containing air conditioning medium or air at different temperatures. The inlet conduits 11 and 12 include valve means indicated generally at 20 and 21 respectively controlling flow of the air conditioning medium or air from the supply conduits 14, 15 through the inlets to the interior of the mixing chamber or box 10. The valves shown herein are of the self-contained type comprising generally valve housings 29, 30, each including a weir 25 and a diaphragm 26 which cooperate to close the opening through the valve from the inlet conduit to the interior of the chamber. The respective diaphragms 26 are moved by means of air pressure in motive chambers 27, 28 for the respective valves 20, 21 formed by means of a housing 29, 30 and the diaphragms 26. Air is supplied to these motive chambers by means of inlet piping conduits 33, 34 which are connected in respective inlet conduits 11, 12 and to associated control apparatus in which the bleed from such conduits are controlled and the pressure operating on the diaphragms is applied to the motive chambers through conduits 36, 37 respectively for the valves 20, 21. The discharge opening 13 is designed to be connected to or be positioned in a space to be air conditioned indicated generally at 50.

The inlet or main valve 20 associated with the inlet conduit 11 which may, for example, be connected to the cold supply conduit supplying the mixing box 10, is controlled by a pressure regulator device indicated generally at 40. This pressure regulating device utilizes the mixing box itself as the housing or container for the pressure to be sensed and incorporates a pivoted baffle indicated at 41 which is pivoted on pivots 42. The baffle 41 serves the dual function of diffusing or mixing the air flow from the inlet conduits in chamber 10 before it is discharged to or through the outlet conduit 13 to the space to be air conditioned. The pivoted baffle 41 may be one of a plurality of baffles (only the pivoted baffle being shown in the drawing) which serves the purpose of diffusing and mixing the air within the chamber or mixing box 10.

As will be seen in FIGURES 1 and 2, this pivoted baffle extends substantially across the mixing box in a direction normal to the flow of air therethrough such that it will sense an average of the total pressures within the mixing box. The pivoted baffle has associated therewith a spring means or bias spring 45 which is secured at one extremity to the interior of the mixing box 10 such as is indicated at 46 and at the other extremity to said pivoted baffle or blade such as is indicated at 48 in FIGURE 1. The pivoted biased baffle being housed in the mixing box and substantially filling the same provides with the mixing box a pressure regulating device or pressure sensing device responsive to pressure within the box and pressure near the outlet thereof to provide a control movement against the spring 45. Associated with this pivoted baffle is a double orifice or nozzle construction 52, 53 which nozzles or orifices are connected respectively to the conduits 33, 36 leading to the motive chamber 27 and the inlet conduit 11. The orifices or nozzles are concentric in construction and permit air under pressure from the inlet conduit 11 to flow through the conduit or pipe 33 where it is controlled at the orifice 52 by the position of the pivoted baffle 41 with respect thereto through the orifice 53 and the conduit 36 to the motive chamber 27 controlling the position of the diaphragm 26 of valve 20 with respect to the weir 25 to control the air flow through the inlet conduit 11 to the interior of the mixing chamber or box 10. The opposite valve 21 utilizes the same self-contained valve construction and the supply conduits are controlled by a pressure responsive device best seen in FIGURE 2.

The pressure regulating device for the valve 21 includes a housing positioned within the mixing chamber and indicated generally at 60 which housing has a diaphragm 61 therein defining a chamber 63 which is open to the interior of the mixing chamber or box 10 through a restricted opening 64. The diaphragm defining this chamber cooperates with a double orifice or nozzle construction 66, 67 in a chamber 71 behind the diaphragm which is vented to atmosphere as at 69 and contains a spring 72 acting against the diaphragm. The nozzles 66, 67 lead respectively to the inlet conduit 12 through a piping 34 and the motive chamber 28 of valve 21 through a conduit 37. Thus, movement of the diaphragm 61 will act in the same manner as the baffle 41 to vary the pressure to the motive chamber 28 or valve 21 positioned in inlet conduit 12. It will be noted in this pressure regulator that the pressure within the chamber 63 positioning the diaphragm 61 relative to the double orifices or nozzles 66, 67 is supplied from the mixing box 10 as a source through restriction 64 and is referenced to atmospheric pressure and spring 72.

This pressure is supplied through a conduit 68 to a bleed type room thermostat or temperature responsive unit indicated generally at 70 and positioned within the space 50. This is a conventional device shown in schematic form and is merely a temperature responsive means operating a bleed type valve to reset or vary the mixing box static pressure within the chamber 63 to control with the box static pressure from the mixing box 10, the position of the diaphragm 61 and hence the pressure in motive chamber 28 controlling the position of the valve 21 in the control of air from the inlet conduit 12 and supply conduit 15 to the interior of the mixing chamber or box 10.

As indicated above, the inlet conduit 11 would quite generally be connected in a mixing box heating operation to the cold supply conduit such as is indicated or suggested by conduit 14, while the inlet conduit 12 of mixing box 10 would be connected to the conduit carrying the warmer air such as indicated by 15 in FIGURE 1. Thus, the warm air control valve 21 of the mixing box would be controlled by pressure regulator responding to box static pressure within the mixing box 10 reset by the thermostat 70 within the space to be air conditioned, and the cold valve such as indicated by the valve 20 would be controlled by the pressure regulator formed by the box itself and a mixing baffle 40 to control the flow through the valve 20 and hence the total outflow from the mixing chamber or box 10 to the space to be air conditioned. The pressure regulator for the warm air control valve 21 becomes primarily effective when thermostat 70 calls for all warm air. Thus, when the cold air valve 20 has been closed through the operation of its pressure regulating device 40 and the warm air valve 21 is wide open, the regulator controlling this warm air valve will limit the total volume of warm air being delivered to the interior of the mixing box in accordance with the setting of this regulator. That is, the spring 72 acting against diaphragm 61 will determine with the pressure in chamber 63 the bleed through the nozzles 66, 67. An increase in the mixing box static pressure due to an increase in the warm air supply duct pressure or pressure in duct 15 will increase the pressure in regulator chamber 63 which is controlled by the thermostat, causing the diaphragm 61 to move closer to the nozzles 66, 67 and throttling the warm air flow through valve 21 by increasing the pressure in its motive chamber 28.

The use of the large orifices cooperating with the pivoted baffle and the pressure responsive diaphragm in the control of the pressure within the motive chambers of the self-contained valves permits dirt-free operation and accurate low pressure control. A spring means 72 within the pressure regulator or control 60 acting against the diaphragm 61 insures that the diaphragm will follow variation in pressure within the mixing chamber in a conventional manner. This simplified pressure regulator and control for mixing box control apparatus permits economy in manufacture while maintaining accuracy in control.

In considering this invention, it should be remembered that the present disclosure is intended to be illustrative only and the scope of the invention is to be determined only by the appended claims.

I claim as my invention:

1. In air conditioning control apparatus, a mixing box, a pair of inlet conduits positioned in said box and adapted to be connected to supply conduits carrying air of different temperatures, self-contained valve means positioned in said inlet conduits and controlling the flow of temperate air from the supply conduits to said mixing box, said mixing box having a discharge opening in said mixing box adapted to discharge temperate air to a space to be air conditioned, a mixing baffle positioned in said mixing box and extending substantially across the interior of the same to be affected by an average pressure within the box, said baffle being pivotally mounted within said box and including a spring bias means connected thereto, said mixing box with said biased baffle providing a pressure regulator within the mixing box, orifice means positioned within said mixing box adjacent said pivoted baffle and controlled by movement thereof, said orifice means including a pair of concentric orifices, one leading to the inlet conduit and the other to the motive chamber of one of said self-contained valves, said just-named orifice means controlling with said pivoted baffle the pressure in the motive means of said one of said self-contained valves in one of said inlet conduits, and temperature responsive means adapted to be responsive to the temperature of a space to be air conditioned and connected in controlling relation to the second self-contained valve positioned in said second inlet conduit.

2. In air conditioning control apparatus, a mixing box, a pair of inlet conduits positioned in said box and adapted to be connected to supply conduits carrying air of different temperatures, self-contained valve means positioned in said inlet conduits and controlling the flow of temperate air from the supply conduits to said mixing box, said mixing box having a discharge opening in said mixing box adapted to discharge temperate air to a space to be air conditioned, a mixing baffle positioned in said mixing box and extending substantially across the interior of the same to be affected by an average pressure within the box, said baffle being pivotally mounted within said box and including a spring bias means connected thereto, said mixing box with said biased baffle providing a pressure regulator within the mixing box, orifice means positioned within said mixing box adjacent said pivoted baffle and controlled by movement thereof, said orifice means including a pair of concentric orifices, one leading to the inlet conduit and the other to the motive chamber of one of said self-contained valves, said just-named orifice means controlling with said pivoted baffle a pressure in the motive means of said one of said self-contained valves in one of said inlet conduits, additional orifice means including a pair of concentric orifices, one of which leads to the inlet conduit of the other self-contained valve and the other of said orifices leading to the motive chamber of the other of said self-contained valve means in said inlet conduits, said orifices cooperating with a pressure responsive means responsive to the pressure in said mixing chamber, and temperature responsive means adapted to be responsive to the temperature of a space to be air conditioned and connected in controlling relation to the last-named pressure responsive means to reset the same in control of the second of said self-contained valve means positioned in the second of said inlet conduits.

3. In air conditioning control apparatus, a mixing box, a pair of inlet conduits positioned in said box and adapted to be connected to supply conduits carrying air of different temperatures, valve means positioned in said inlet conduits and controlling the flow of temperate air from the supply conduits to said mixing box where it is mixed therein, said mixing box being formed to provide a flow path and having a discharge opening in said flow path adapted to discharge temperate air to a space to be air conditioned, said discharge opening being of less area than the cross sectional area of said flow path of said box, a mixing baffle positioned in said mixing box on the inlet side of and substantially uniformly spaced from said discharge opening and extending substantially in all directions across a major portion of the flow path of said box to be affected by an average pressure within the box, said mixing baffle being of greater area than and extending beyond the edges of said discharge opening in all directions, said baffle being movably mounted within said box for movement toward and away from said discharge opening and subjected to a pressure differential of the pressure within the box and the discharge pressure from said box, and said baffle being biased away from said discharge opening, control valve means operated by movement of said baffle towards said discharge opening against said bias under the influence of the pressure differential, said mixing box with said biased baffle forming with the mixing box a pressure regulator, said control valve means associated with said pressure regulator controlling one of said valve means in one of said inlet conduits to control flow from one of said supply conduits into said mixing box, and temperature responsive means responsive to the temperature of the space to be air conditioned connected in controlling relation with a second of said valve means positioned in a second of said inlet conduits.

4. In air conditioning control apparatus, a mixing box, a pair of inlet conduits positioned in said box and adapted to be connected to supply conduits carrying air of different temperatures, valve means positioned in said inlet conduits and controlling the flow of temperate air from the supply conduits to said mixing box where it is mixed therein, said mixing box being formed to provide a flow path and having a discharge opening in said flow path adapted to discharge temperate air to a space to be air conditioned, said discharge opening being of less area than the cross sectional area of said flow path of said box, a mixing baffle positioned in said mixing box on the inlet side of and substantially uniformly spaced from said discharge opening and extending substantially in all directions across a major portion of the flow path of said box to be affected by an average pressure within the box, said mixing baffle being of greater area than and extending beyond the edges of said discharge opening in all directions, said baffle being pivotally mounted within said box to one wall thereof for movement toward and away from said discharge opening and subjected to a pressure differential of the pressure within the box and the discharge pressure from said box, and said baffle being biased away from said discharge opening, control valve means operated by movement of said baffle towards said discharge opening against said bias under the influence of the pressure differential, said mixing box with said biased baffle forming with the mixing box a pressure regulator, said control valve means associated with said pressure regulator controlling one of said valve means in one of said inlet conduits to control flow from one of said supply conduits into said mixing box, and temperature responsive means responsive to the temperature of the space to be air conditioned connected in controlling relation with a second of said valve means positioned in a second of said inlet conduits.

References Cited in the file of this patent

UNITED STATES PATENTS

| | | |
|---|---|---|
| 1,656,677 | Neumann | Jan. 17, 1928 |
| 2,056,519 | Hodgkinson | Oct. 6, 1936 |
| 2,127,162 | Beauregard | Aug. 16, 1938 |
| 2,479,177 | Miller | Aug. 16, 1949 |
| 2,609,183 | Fitzgerald | Sept. 2, 1952 |
| 2,815,915 | Salerno | Dec. 10, 1957 |
| 2,822,132 | McDonald et al. | Feb. 4, 1958 |
| 2,828,076 | Donahue | Mar. 25, 1958 |
| 2,991,937 | Bottorf et al. | July 11, 1961 |